Jan. 25, 1966 J. J. YUZA 3,231,149
DISPENSER FOR VISCOUS FLUIDS
Filed April 13, 1964 2 Sheets-Sheet 1
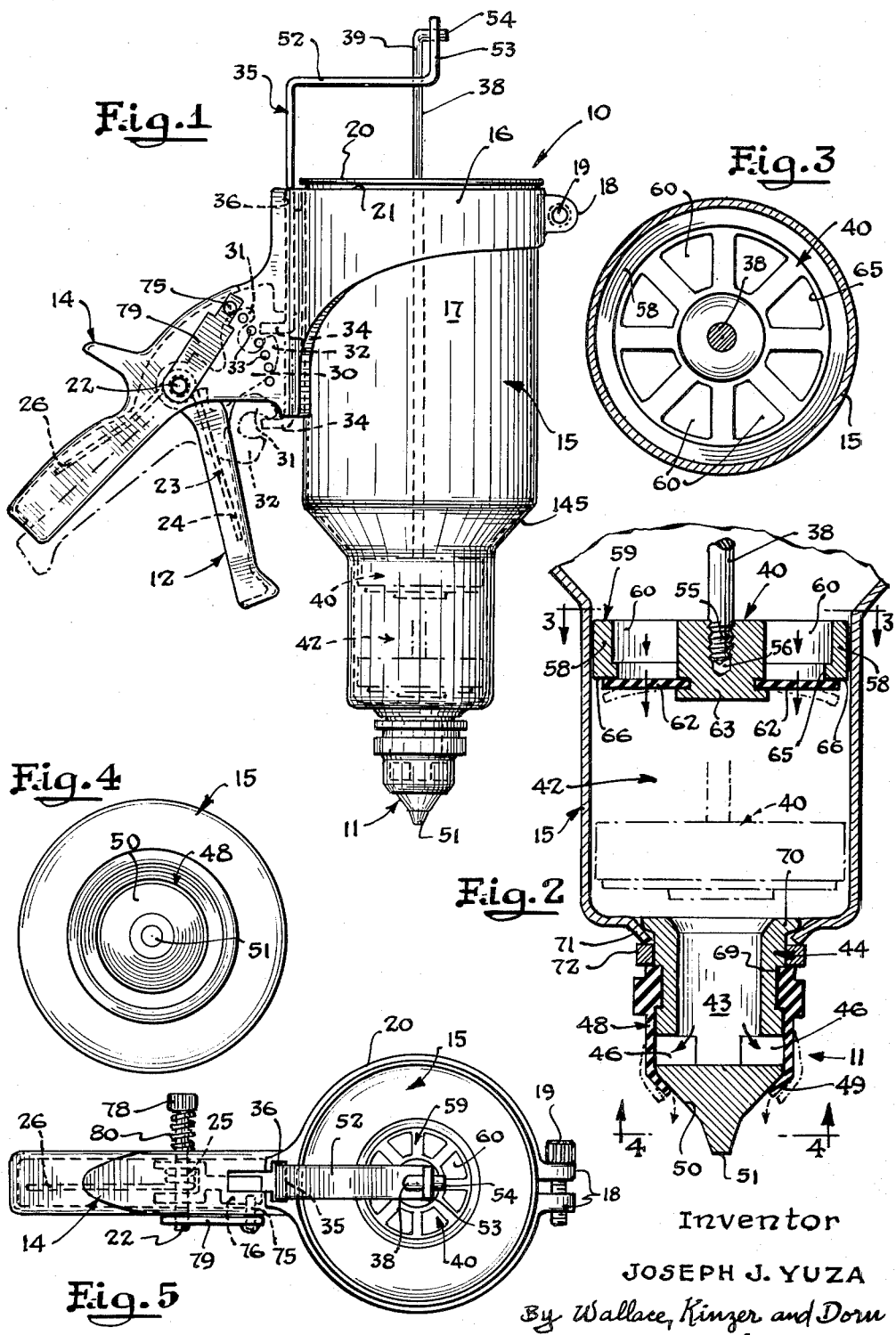
Inventor
JOSEPH J. YUZA
By Wallace, Kinzer and Dorn
Attorneys Inventor
JOSEPH J. YUZA
By Wallace, Kinzer and Dorn
Attorneys United States Patent Office 3,231,149
Patented Jan. 25, 1966

3,231,149
DISPENSER FOR VISCOUS FLUIDS
Joseph J. Yuza, 3816 W. 64th St., Chicago, Ill.
Filed Apr. 13, 1964, Ser. No. 359,072
5 Claims. (Cl. 222—324)

This invention relates to a fluid dispenser and more particularly to a fluid dispenser adapted to measure the amount of fluid dispensed and to control the pattern of dispensed fluid. The dispenser is particularly useful in dispensing food products, such as batter, heavy sauces, and the like.

The present invention is directed to the dispensing of relatively viscous fluids or liquids such as pancake, muffin, and doughnut batters, condiments such as ketchup and mustard, and the like. Batters and condiments such as ketchup and mustard are not as free-flowing as relatively less viscous fluids such as water, beverages or the like and these more viscous fluids must be forced from the dispenser. Consequently, it is often difficult to measure out predetermined portions or charges. A further problem with such viscous fluids as batters and condiments is that the pattern of fluid flow is often uneven and when enough pressure is exerted to force the fluid from its container the fluid comes gushing out at too fast a rate and in an uneven pattern. Also, openings or nozzles through which the fluid exits are subject to becoming clogged with condiment or batter that dries and cakes upon exposure to the air.

Accordingly, an object of the present invention is an improved dispenser for batters, condiments or the like, of low cost construction and employing relatively few and simple elements for metering out a predetermined quantity of material and for controlling the flow of the dispensed charge.

Another object of the invention is the performing of the dual functions of measuring a portion of the viscous fluid and forcing the flow of the viscous fluid by a unique combined piston-valve element which functions in one direction of operation as a valve, and which functions in the other direction of the operation as a piston.

A particular problem with viscous fluids and fluid slurries such as batters or heavy condiments is in the control of the pattern of discharge of the viscous fluid to cover a predetermined area uniformly and in the desired configuration. Thus, a further object of the invention is the provision of a novel spout and flexible valving member for evening out the rate of fluid flow and for directing the fluid flow in a predetermined pattern.

A further object of the invention is a novel, low cost dispenser for batters, condiments or the like having a simple control adjustment for varying the amount of viscous fluid dispensed by controlling the amount of the piston stroke through a metering chamber.

According to the preferred embodiment of the invention, the dispenser includes a bowl or container for receiving the batter or the like, and has in its bottom portion a metering or measuring chamber through which a piston is reciprocated upon actuation of a trigger lever of a piston grip handle secured to the side of the bowl. The dispenser is preferably a lightweight and portable dispenser wherein the operator positions a discharge nozzle over the area to receive the batter and pulls the trigger lever to cause a piston to force the batter in the metering chamber through an opening in the nozzle. The nozzle includes a resilient sleeve encompassing a spout; the sleeve is expanded by the batter issuing from an opening in the spout and the resiliency of the sleeve controls the rate of flow of batter from the opening in the spout. The resilient sleeve also causes the batter to flow in a predetermined pattern. Release of the trigger permits an operating spring to return the piston to its original position. The piston has openings therein, through which openings the batter moves into the metering chamber. These openings are covered by resilient covering elements adapted to be deformed away from the openings by movement of the batter through the openings in the piston. The resilient covering elements close and seal the openings in the piston when the piston is moving in the discharge direction. A simple stop element can be positioned in any one of the plurality of positions to limit the amount of piston stroke, and thereby the amount of batter metered through the openings in the piston.

Other and further objects of the present invention will be apparent from the following description and claims and are illustrated in the accompanying drawings which, by way of illustration show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a front elevational view of the dispenser, according to the preferred embodiment of the invention;

FIG. 2 is a sectional view showing the valve-piston and nozzle of the dispenser of FIG. 1;

FIG. 3 is a sectional view taken approximately along the line 3—3 in FIG. 2 in the direction of the arrows showing the openings in the piston;

FIG. 4 is a bottom view taken approximately along the line 4—4 of FIG. 2 in the direction of the arrows;

FIG. 5 is a plan view of the dispenser of FIG. 1;

Figure 6:
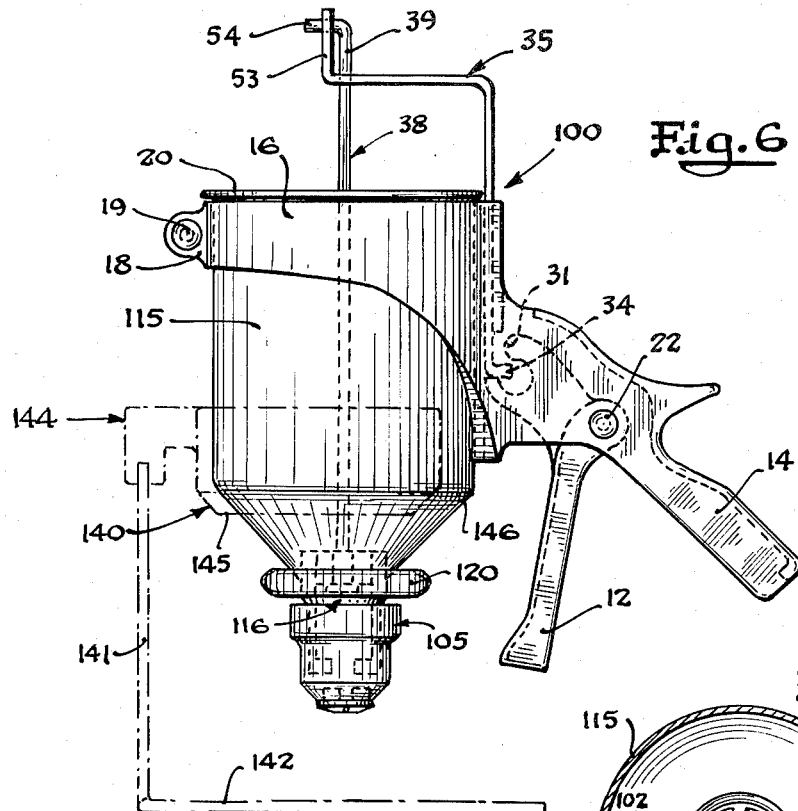
FIG. 6 is an elevational view of another embodiment of the invention, particularly adapted for the dispensing of condiments.

Referring now to the drawings and more particularly to FIG. 1, there is illustrated a portable dispenser 10, particularly adapted for metering and discharging a viscous fluid from a nozzle 11 upon operation of a trigger lever 12 of a piston-like handle 14. Since the dispenser is particularly adapted to dispense foods such as batters, or condiments for consumption by human beings, the elements of the dispenser 10 are preferably made of stainless steel, plastic, or silicone rubber of the types not readily corroded or attacked by the acids in food. Also, these materials are easy to clean. While the dispensers are hereinafter described as being employed to handle batters or condiments, the invention is not limited to any particular kind of material being dispensed as it is capable of use with many varying kinds of fluids of different viscosities.

The pistol-like handle 14 is secured to a cylindrically-shaped bowl or container 15 by a pair of wrap-around sleeves 16 disposed for tightened engagement with an outer cylindrical surface 17 of the bowl 15. The wrap-around sleeves 16, as best seen in FIGS. 1 and 5, extend from the pistol-like handle 14 about the bowl 15 and terminate in a pair of outwardly extending lugs 18 at least one of which is tapped to receive a tightening screw 19. Tightening of the screw 19 causes greater gripping force of the sleeves 16 with the cylindrical surface 17 of the bowl 15. Preferably, the bowl 15 is open at the top and has slight outwardly extended flange 20 adapted to overlie an upper edge 21 of the sleeves 16 to facilitate holding of the bowl 15 on the handle 16 against the downward pull of gravity, particularly when the bowl 15 is full of heavy batter, condiment or the like.

To dispense a measured portion of batter, the operator squeezes the handle 14 to pivot the trigger lever 12 clockwise, FIG. 1, about a pivot pin 22 against the bias of a bent spring 23. Spring 23 has one leg 24 disposed in the hollow portion of the trigger lever 12, a plurality of turns 25, FIG. 5, about the pivot pin 22, and another leg 26 disposed in the handle 14. The trigger lever 12 has a jaw or fork portion 30 with an upper jaw member 31 and a lower jaw member 32 between which is inserted and captured the lower, bent end 34 of a slide bar 35 adapted to slide in an opening 36, FIG. 5, in the pistol handle 14. Thus, with the rotation of the trigger 12 in a clockwise direction, the upper jaw member 31 engages the upper surface of the bent end 34 of the slide bar 35 and forces the slide bar 35 downwardly through the opening 36 to the phantom line position shown in FIG. 1.

Upon squeezing the trigger lever 12 and moving slide bar 35 downwardly, batter is dispensed. More specifically, the slide bar 36 is operatively connected to a piston rod 38 to drive a piston and valving means 40 downwardly through a metering chamber 42 formed integrally with the lower portion of the bowl 15. As seen in FIG. 2, downward movement of the piston 40 in the metering chamber 42 forces the batter disposed therein through a central opening 43 in a spout element 44 and through a plurality of openings in the side walls of the spout element 44. The force of the batter 46, under pressure of the piston, forces a resilient sleeve 48, surrounding an outer surface of the spout 44, outwardly of the spout to the dotted line position, FIG. 2. The batter, moving between the spout and the inwardly turned terminal portions 49 of the resilient member 48, is directed to flow about a conical surface 50 on spout element 44 and thus flow in a predetermined pattern.

The resilient member 48 smooths out the flow of batter through the openings 46 so that the batter flows at a more uniform rate. That is, batter under pressure tends to flow at uneven rates out of the openings 46 and the resilient resisting force of the sleeve element 48 tends to even out and smooth the rate of discharge rather than permitting a large slug of batter to be forced through an opening in an irregular flow. Stated again, rather than merely having an opening in the bottom of the spout 44 through which the batter would move in slugs or varying rates of discharge, the resilient sleeve 48 flexes with variable rates of discharge through the openings 46 and smooths and evens out the flow of batter along the conical surface 50 to provide a more uniform rate of discharge and pattern of flow of the discharge batter. The resilient element 48 also prevents leakage of batter from the openings 46 while permitting discharge of batter under pressure through the openings 46. The spout element 44 has a tip 51 which can be placed on the mold or plate adapted to receive the batter to steady the dispenser, if so desired.

Turning now to a more detailed consideration, it will be seen that the slide bar 35 is a flat bar having a generally horizontal portion 52 with an aperture therein through which extends the vertically oriented upper end 39 of the piston rod 38. The slide bar 35 terminates in a vertically disposed portion 53 having another aperture to receive a horizontally bent end 54 of the piston rod 38. Because of the insertion of the bent end 54 of the piston rod 38 in the aperture in slide bar 35, the piston rod 38 must move vertically with vertical movement of the slide bar 35 either in response to squeezing of the trigger lever 12 toward the handle 14 by an operator or movement of the trigger lever 12 away from the handle 14 under the force of spring 23.

The piston rod 38 is connected to the valve and piston means 40 by a threaded end 55, FIG. 2, threaded into a tapped hole 56 in a piston body 59 of the piston-valve means 40. The piston body 59 is preferably a solid metal or plastic body having an exterior annular side wall 58 of a size closely approximating the size of the chamber 42. The piston body 59 has a plurality of sector-shaped openings 60 therein through which the batter moves during upward vertical movement of the piston and valve means 40. Secured to the underside of the piston body 59 is a washer-like cover member 62 which has its inner edges secured in a circular slot formed on the center portion 63 of the piston body 59. The washer-like cover member 62 extends beyond the outer edges 65 of the openings 60, and into engagement with the underside 66 of the annular flange portion 58 of the piston body 95.

As hereinbefore described, the downward movement of the piston rod 38 exerts pressure on the fluid batter in the metering chamber 42 and forces the covering member 62 against the lower surface 66 of the piston body 59, so that all of the openings 60 are closed to forestall upward movement of the batter through the openings 60. Thus, when the piston and valve means 40 are moving in the discharge direction, in this instance downwardly, the cover member 62 covers the openings 60 and the piston and valve means 40 functions in the manner of a solid piston. Conversely, on the upstroke, the piston and valve means 40 functions as a valve. The weight of the batter and the vacuum created in chamber 42 upon upward movement of piston body 59 combine to force resilient members 62 to their dotted line positions (FIG. 2) so that batter flows into the metering chamber 42 and fills the chamber 42 with batter, while the piston rod 38 is moving upwardly. The annular member 62 is preferably made of silicone rubber or like material. The amount of batter dispensed and metered is a function of the piston stroke movement in the metering chamber 42.

In the embodiment of the invention shown in FIG. 1, the nozzle 11 includes the spout member 44 having the vertical passageway 43 in the center of the spout member 44. Thus, fluid under force from the piston moves downwardly through the passageway 43 and through the openings 46. The member 44 has an upper flange 70 overlying a downturned edge 71 at the bottom of the chamber 42, and has a locking and sealing ring 72 disposed beneath the downwardly-turned portion 71 of the chamber 42. The resilient member 48 is preferably a sleeve having an upper thickened portion configured to being disposed in a securing groove 69 in the outer surface of the spout member 44. Because of the thinner cross section of the resilient sleeve 48 at the portion covering the openings 46, the pressure of the batter on edge 71 of the member 48 cannot exert sufficient downward force to remove the resilient sleeve 48 from the spout member 44.

The piston and valve means 40 travels, for example, between the two phantom line positions shown in FIG. 1, with operation and release of the trigger lever 12. The amount of travel of the piston and valve means 40 in the metering chamber 42, and hence the amount of fluid batter moving through the openings 60, is controlled by a stop pin 75 engaging an upper lug 76 extending from the slide jaw member 31 toward the pin 75. The pin 75 engages the lug 76 and limits the return movement of the trigger lever 12 under the influence of the spring 23.

The pin 75 is carried on an adjustment pawl 79 pivotally mounted on the pivot pin 22. The pivot pin 22 is disposed in the handle 14 for sliding movement and has on the opposite side of the handle 14 a push button 78. By pressing on push button 78 the pin 22 is slid into the handle 14 (see FIG. 5) to remove the pin 75 from one of the series of holes 33 provided on the outer surface of the handle 14. Thus, it is apparent that the spring 80 disposed between the push button 78, on one side of the handle 14, provides the retaining force for retaining pin 75 in one of the selective holes 33. Also, compression of the spring 80 by moving the pivot pin 22 and attached stop pawl 76 until the stop element 75 is removed from one of the holes 33 permits the stop pawl 76 to be pivoted to align the stop element 75 with another one of the holes, whereupon release of the push button 78 permits the spring 80 to return the pin 75 in a hole 31 for engagement with the lug 76 on the trigger lever 12.

Another embodiment of the dispenser is shown in FIGS. 6-10, inclusive; this dispenser 100 is particularly adapted to the dispensing of heavy condiments such as mustard or ketchup. The dispenser 100 shown in FIG. 6 is of generally the same construction as the dispenser 10 shown in FIG. 1, except for a change in nozzle and piston construction to accommodate the relatively less viscous condiments such as ketchup or mustard. As readily seen in FIG. 7, a piston body 101 on the end of piston rod 38 is of much smaller size than the piston body 59, Likewise, the openings 102 in the piston body 101 are smaller in size and fewer in number than the corresponding openings 60 in the piston body 49 (FIG. 2) used for dispensing batter.

Figure 7:
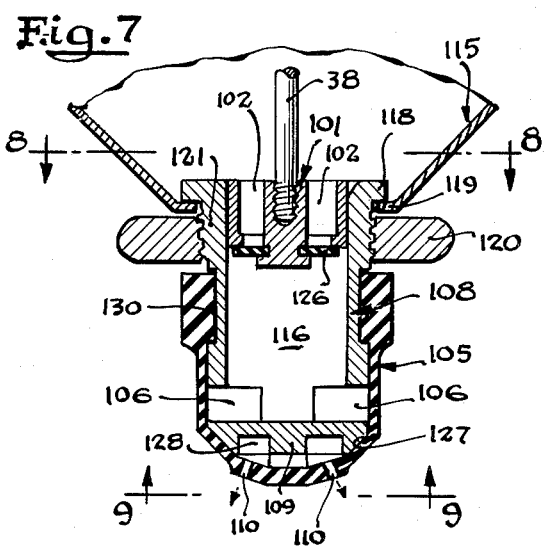
FIG. 7 is a sectional view showing the piston and nozzle of the dispenser of FIG. 6.
Figure 8:
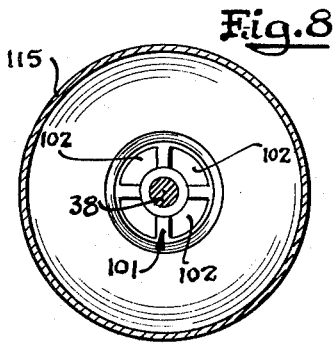
FIG. 8 is a sectional view showing the openings in the piston, taken approximately along the lines 8—8 of FIG. 7 in the direction of the arrows.
Figures 9, 10:
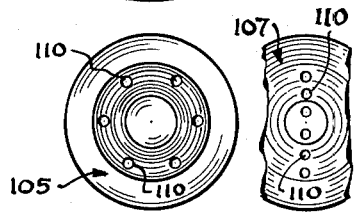
FIG. 9 is a view taken approximately along the lines 9—9 in FIG. 7 in the direction of the arrows and showing the bottom of the nozzle.
FIG. 10 is an illustration of another pattern of openings in the bottom of the nozzle of FIG. 7.

In the embodiment of the invention shown in FIG. 7, a resilient sleeve 105 not only extends to cover openings 106 in the side walls of a spout member 108, but also extends downwardly about the spout and covers the bottom portion 109 of the spout. The resilient sleeve 105 is provided with a plurality of spaced apertures 110 in the bottom thereof in a circular arrangement, FIG. 9, for dispensing condiments for hamburgers or the like. A similar resilient sleeve 107, which has openings arranged in a longitudinally extending line for hot dogs or the like, can be substituted for the resilient sleeve 105.

The bowl 115 of the dispenser 100 does not have a metering chamber 42 as in the bowl 15. Instead, a metering chamber 116 is formed centrally of the spout 108 with the piston 101 adapted to reciprocate within the chamber 116. The spout 108 is attached to the bowl 115 by inserting the spout 108 downwardly through the bowl 115 until a flange 118 of the spout 108 engages the lower edge 119 in the base of the bowl, whereupon a tightening collar 120 is rotated upwardly on the threaded portion 121 of the spout 108 to clamp the lower edge of the bowl against the flange 118.

With the spout 108 attached to the bowl 115 and the piston 102 disposed in the metering chamber 116, downward movement of the piston rod 38 in response to the squeezing of the trigger lever 12 towards the handle 14 causes a resilient cover member 126 to block the openings 102. The condiment is forced through the openings 106 to expand the resilient sleeve 105 at the openings 106 so that the condiment flows downwardly along the conical surface 127 of the spout 108 and into and through the spaced openings 110. A plurality of chambers or openings 128 are formed adjacent the openings 110 in the bottom of the resilient member 105. The chambers 128 provide a reservoir for the condiment to prevent the rapid drying of the condiment in the apertures 110 and the clogging of the apertures 110 with dried condiment.

It will be recognized that many different types of arrays of perforations 110 can be provided in the resilient sleeves such as the resilient sleeves 105 and 107. The sleeves 105 and 107 are preferably made of silicone rubber, although other resilient materials compatible with the liquids being dispensed may also be employed. With the spout 108, either one of the sleeves 105 can be readily peeled from the securing shoulder 130 on the spout 108 and be replaced with another flexible sleeve of the same or different configuration. Thus, resilient sleeves can be readily changed from cleaning or to acquire different patterns of discharge.

The resilient covering member 126 for holes 102 in the piston body 101 functions in the same manner as the resilient covering member 62, in FIG. 1. That is, the resilient member 126 functions as a valve element to permit the filling of the metering chamber 116 with condiment on the upstroke of the piston 101. The amount of condiment being dispensed is controlled in the same manner by means of a stop pin (not shown for purposes of clarity) limiting the upward movement of the slide bar 35, and clockwise rotation of the upper jaw member 31 of the trigger lever 12. Either of the dispensers 10 or 100 can readily be stored or employed as a piece of stationary apparatus by disposing the bowl 15 or 115 in a suitably shaped stand 140, FIG. 6, having a holder 144, an upstanding arm 141, and a base 142. Preferably, the stand 140 has an inturned lower flange 145 adapted to receive the conical-shaped surface 146 on the bowls 15 or 115. Thus, the dispenser can be removed from the holder merely by lifting the bowl and the dispenser is secured for either storage or operation simply by inserting the bowl into the holder.

From the foregoing, it will be seen that the present invention affords a unique dispenser adapted to meter out variable portions or charges of a viscous fluid such as a batter or a condiment. Also, the novel piston and valve arrangement of the invention provides the dual functions of metering and forcing the viscous fluid from the metering chamber.

Advantageous, the present invention also controls and smooths out the rate of discharge of the viscous fluid by means of an expandable and contractable covering. Also, the expandable and contractable member forces the batter or condiment to flow in a predetermined pattern such as about a conical surface 50 (FIG. 2) or through suitably arranged apertures 110 (FIG. 7). Moreover, the present invention affords a readily positioned stop element to limit the operating stroke of the piston and thereby the amount of viscous fluid metered through the piston and valve means and into the metering chamber.

Hence, while preferred embodiments of the invention have been described and illustrated, it is to be understood that they are capable of variation and modification.

I claim:

1. A dispenser for relatively viscous fluids such as batter, condiments and the like comprising: a cylindrical container for holding a supply of the fluid to be dispensed; a dispensing nozzle comprising a cylindrical metering chamber having an open end in fluid communication with said container, the opposite end of said metering chamber being closed by a spout member having an imperforate end wall, said spout member having a plurality of openings in the side walls thereof; plunger means extending through said container and into the open end of said metering chamber for forcing fluid outwardly through said side wall openings, said plunger means including a check valve allowing fluid to flow from said container into said metering chamber but preventing reverse flow back to said container; operating means for reciprocating said plunger means; and a resilient cover comprising a sleeve encompassing said spout member and closing off said side wall openings, said sleeve being expandable in response to a build up of fluid pressure in said chamber to permit discharge of fluid between said sleeve and the external surface of said nozzle so that said fluid is dispensed in a predetermined pattern from said spout member.

2. The dispenser of claim 1 in which said resilient cover member includes an integral end portion covering at least the peripheral part of said spout member, said end portion including at least one opening for discharging fluid therefrom.

3. The dispenser of claim 2 in which the end portion of said resilient cover member has a single central opening through which said spout member projects so that said fluid is discharged in a single controlled stream.

4. The dispenser of claim 2 in which the end portion of said resilient cover member has a plurality of individual apertures for discharging the fluid in a predetermined plurality of discrete controlled streams.

5. The dispenser of claim 4 in which said spout member affords at least one fluid reservoir, comprising a surface depression, for retaining a small quantity of fluid between said cover member and the external surface of said spout member.

References Cited by the Examiner

UNITED STATES PATENTS

| | | | |
|---|---|---|---|
| 1,637,548 | 8/1927 | Burbank | 222—494 |
| 2,104,990 | 1/1938 | Hoefler | 222—324 X |
| 2,580,455 | 1/1952 | Myers | 137—525 |
| 2,663,309 | 12/1953 | Filliung | 137—525 X |
| 3,027,053 | 3/1962 | Aluotto | 222—309 |
| 3,096,914 | 7/1963 | Kerr | 222—494 X |
| 3,144,968 | 8/1964 | Martino et al. | 222—380 |
| 3,150,802 | 9/1964 | Pribyl | 222—324 X |

M. HENSON WOOD, JR., *Primary Examiner.*

LOUIS J. DEMBO, *Examiner.*